US011310527B2

(12) United States Patent
Lee

(10) Patent No.: US 11,310,527 B2
(45) Date of Patent: Apr. 19, 2022

(54) VIDEO SIGNAL PROCESSING METHOD AND DEVICE FOR INTRA PREDICTION OF CODING OR PREDICTION BLOCKS BASED ON SAMPLE POSITION BASED PARAMETERS

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/127,824

(22) Filed: Dec. 18, 2020

(65) Prior Publication Data

US 2021/0218991 A1 Jul. 15, 2021

Related U.S. Application Data

(63) Continuation of application No. 16/486,636, filed as application No. PCT/KR2018/002759 on Mar. 8, 2018, now Pat. No. 10,904,568.

(30) Foreign Application Priority Data

Mar. 9, 2017 (KR) ........................ 10-2017-0030279

(51) Int. Cl.
*H04N 19/119* (2014.01)
*H04N 19/126* (2014.01)
(Continued)

(52) U.S. Cl.
CPC ......... *H04N 19/593* (2014.11); *H04N 19/119* (2014.11); *H04N 19/126* (2014.11); *H04N 19/167* (2014.11); *H04N 19/176* (2014.11)

(58) Field of Classification Search
CPC .. H04N 19/593; H04N 19/119; H04N 19/126; H04N 19/167; H04N 19/176; H04N 19/105; H04N 19/96; H04N 19/186
See application file for complete search history.

(56) References Cited

U.S. PATENT DOCUMENTS 8,731,054 B2 * 5/2014 Walker ................ H04N 19/109
375/240.12
2005/0281334 A1 12/2005 Walker et al.
(Continued)

FOREIGN PATENT DOCUMENTS

KR 10-0866293 B1 10/2008
KR 10-1004688 B1 1/2011
(Continued)

OTHER PUBLICATIONS

Jianle Chen et al., "Algorithm Description of Joint Exploration Test Model 1", Document: JVET-B0021, Joint Video Exploration Team (JVET) of ITU-T SG 16 WP 3 and ISO/IEC JTC 1/SC 29/WG 11, 2nd Meeting: San Diego, USA, Feb. 20-26, 2016.

*Primary Examiner* — Susan E. Hodges
(74) *Attorney, Agent, or Firm* — IP Legal Services, LLC

(57) ABSTRACT

The present invention is related to processing a video signal. A method for decoding a video according to the present invention may comprise generating a prediction block of a current block by performing intra prediction, deriving at least one sample position based parameter based on a position of a first prediction sample in the prediction block, and obtaining a second prediction sample by weighted predicting the first prediction sample based on the at least one sample position based parameter. According to the present invention, encoding/decoding efficiency of a video signal can be improved since intra prediction is performed more accurately.

9 Claims, 12 Drawing Sheets

(51) Int. Cl.
  *H04N 19/167*  (2014.01)
  *H04N 19/176*  (2014.01)
  *H04N 19/593*  (2014.01)

(56) References Cited

U.S. PATENT DOCUMENTS

| | | |
|---|---|---|
| 2006/0133486 A1 | 6/2006 | Boyce |
| 2006/0133492 A1 | 6/2006 | Boyce |
| 2011/0007803 A1 | 1/2011 | Karczewicz et al. |
| 2013/0136175 A1 | 5/2013 | Wang et al. |
| 2015/0172677 A1 | 6/2015 | Norkin |
| 2018/0160113 A1 | 6/2018 | Jeong et al. |
| 2018/0295385 A1 | 10/2018 | Alshin et al. |
| 2019/0141318 A1 | 5/2019 | Li et al. |
| 2019/0200011 A1 | 6/2019 | Yoo et al. |

FOREIGN PATENT DOCUMENTS

| | | |
|---|---|---|
| KR | 10-1355332 B1 | 1/2014 |
| WO | 2016/200100 A1 | 12/2016 |

\* cited by examiner

CU

2N×2N

PU

PART_2N×2N   PART_N×2N   PART_2N×N   PART_N×N

PART_nL×2N   PART_nR×2N   PART_2N×nU   PART_2N×nD

VIDEO SIGNAL PROCESSING METHOD AND DEVICE FOR INTRA PREDICTION OF CODING OR PREDICTION BLOCKS BASED ON SAMPLE POSITION BASED PARAMETERS

CROSS REFERENCE TO RELATED APPLICATIONS

This application is a Continuation of U.S. patent application Ser. No. 16/486,636 (filed on Aug. 16, 2019), which is a National Stage Patent Application of PCT International Patent Application No. PCT/KR2018/002759 (filed on Mar. 8, 2018) under 35 U.S.C. § 371, which claims priority to Korean Patent Application No. 10-2017-0030279 (filed on Mar. 9, 2017), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for multi-tree partitioning which can be used efficiently partitioning an encoding/decoding target block in encoding/decoding a video signal.

An object of the present invention is to provide a method and an apparatus for intra prediction of a coding block or a prediction block which is partitioned by multi-tree partitioning.

An object of the present invention is to provide a recoding medium including a video signal bitstream encoded by the encoding method.

The technical objects to be achieved by the present invention are not limited to the above-mentioned technical problems. And, other technical problems that are not mentioned will be apparently understood to those skilled in the art from the following description.

Technical Solution

A method for decoding a video signal according to the present invention may comprise generating a prediction block of a current block by performing intra prediction, deriving at least one sample position based parameter based on a position of a first prediction sample in the prediction block, and obtaining a second prediction sample by weighted predicting the first prediction sample based on the at least one sample position based parameter.

In addition, the at least one sample position based parameter may be derived based on at least one of a distance between a base reference sample and a corresponding reference sample which corresponds to a current sample, a difference between a value of the base reference sample and a value of the corresponding reference sample, a size of the current block and a shape of the current block.

In addition, the base reference sample may be a reference sample of a predetermined position among reference samples used for intra prediction of the current block.

In addition, the corresponding reference sample may be a reference sample which is located on a same x-axis or a same y-axis as the first prediction sample among reference samples used for intra prediction of the current block.

In addition, obtaining the second prediction sample may comprise deriving a weight calculated value by applying the at least one sample position based parameter to a value of the first prediction sample, and obtaining the second prediction sample by scaling the weight calculated value by using a weight prediction shift parameter and a weight prediction offset.

In addition, the weight prediction shift parameter or the weight prediction offset may be derived based on a width of a height of the current block.

A method for encoding a video signal according to the present invention may comprise generating a prediction block of a current block by performing intra prediction, deriving at least one sample position based parameter based on a position of a first prediction sample in the prediction block, and obtaining a second prediction sample by weighted predicting the first prediction sample based on the at least one sample position based parameter.

An apparatus for decoding a video signal according to the present invention may comprise an inverse quantization unit to generate an inverse quantized coefficient value by inverse quantizing a coefficient value of a residual block extracted from a bitstream, an inverse transform unit to generate a residual sample value of a current block by inverse transforming the inverse quantized coefficient value, and an intra prediction unit to generate a prediction block of the current block by performing intra prediction. The intra prediction unit may derive at least one sample position based parameter based on a first prediction sample in the prediction block, and obtains a second prediction sample by weighted predicting the first prediction sample based on the at least one sample position based parameter.

A recoding medium comprising a video signal bitstream according to the present invention, the video signal bitstream included in the recoding medium may be encoded by a video encoding method comprising generating a prediction block of a current block by performing intra prediction, deriving at least one sample position based parameter based on a position of a first prediction sample in the prediction block, and obtaining a second prediction sample by weighted predicting the first prediction sample based on the at least one sample position based parameter.

The features briefly summarized above for the present invention are only illustrative aspects of the detailed description of the invention that follows, but do not limit the scope of the invention.

Advantageous Effects

According to the present invention, encoding/decoding efficiency of video signal is improved by partitioning an encoding/decoding target block efficiently.

According to the present invention, encoding/decoding efficiency of video signal is enhanced by improving an accuracy of intra prediction by generating a modified prediction sample value, from an intra predicted sample value firstly obtained by intra prediction, based on a sample position based parameter.

The effects obtainable by the present invention are not limited to the above-mentioned effects, and other effects not mentioned can be clearly understood by those skilled in the art from the description below.

MODE FOR INVENTION

Figure 1:
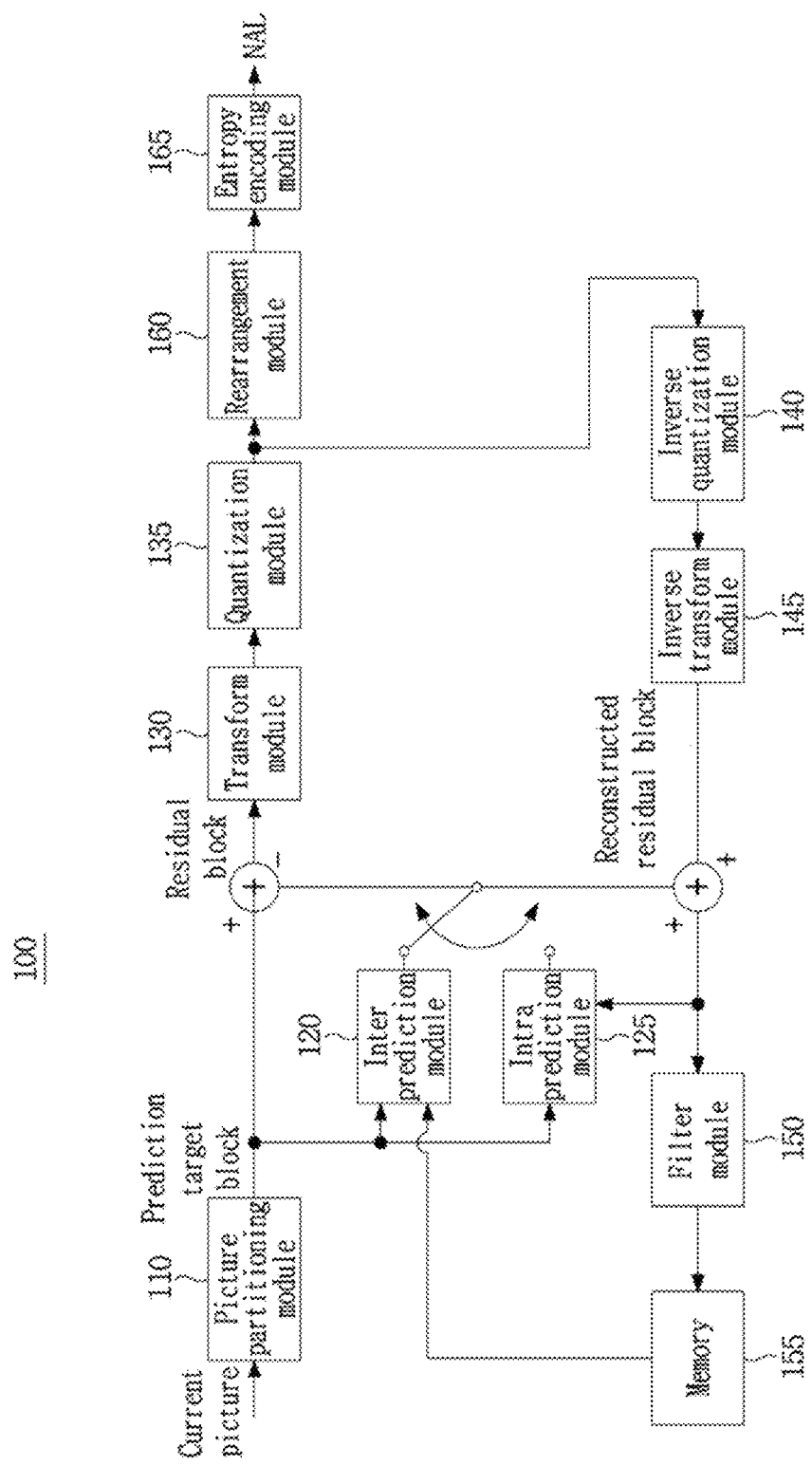
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

In addition, a term "unit" used in the present application may be replaced by a "block", and thus, in the present specification, each term in a pair of "coding tree unit" and "coding tree block", "coding unit" and "coding block", "prediction unit" and "prediction block", and "transform unit" and "transform block" may be interpreted to have the same meaning.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video.

Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
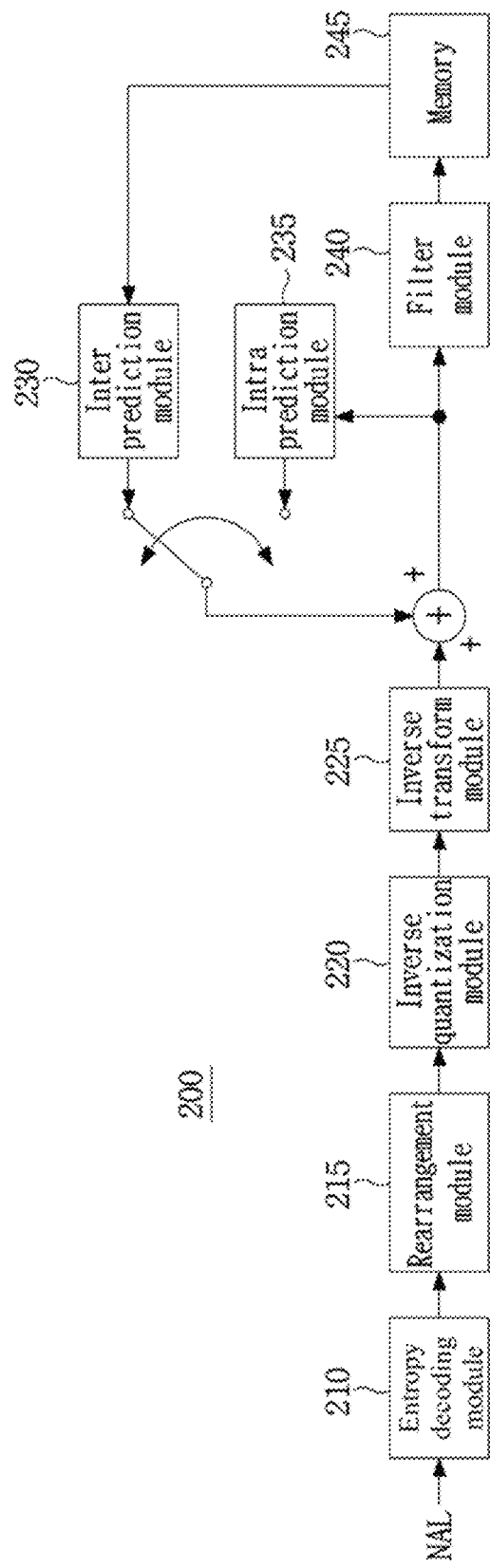
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step. In this specification, a term 'unit' may represent a basic unit for performing a specific encoding/decoding process, and a term 'block' may represent sample arrays of a predetermined size. If there is no distinction between them, the terms 'block' and 'unit' may be used to have equivalent meanings. For example, in the embodiments described below, it can be understood that a coding block and a coding unit have mutually equivalent meanings.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

Figure 3A:
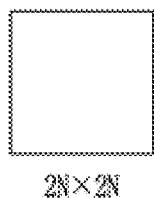
FIGS. 3A and 3B are diagram illustrating a partition mode that can be applied to a coding block.
Figure 3B:
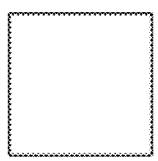
Figure 3B:
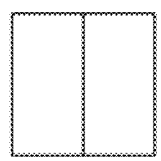
Figure 3B:
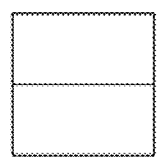
Figure 3B:
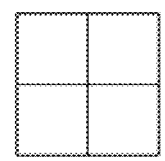
Figure 3B:
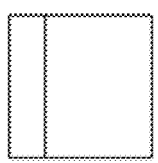
Figure 3B:
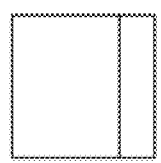
Figure 3B:
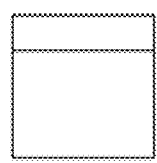
Figure 3B:
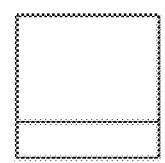

FIGS. 3A and 3B are diagram illustrating a partition mode that can be applied to a coding block when the coding block is encoded by intra prediction or inter prediction. A partition of arbitrary size generated by dividing a coding tree unit may be defined as a coding unit. For example, it is illustrated in FIG. 3A a coding unit of 2N×2N size. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit (TU) or a prediction unit (PU), which is a base unit for performing prediction, quantization, transform or in-loop filtering and the like.

Alternatively, if a coding block is determined, a prediction block having the same size as the coding block or smaller than the coding block may be determined through predictive partitioning of the coding block. Predictive partitioning of the coding block can be performed by a partition mode (Part mode) indicating a partition type of the coding block. A size or shape of the prediction block may be determined according to the partition mode of the coding block. The partition type of the coding block may be determined through information specifying any one of partition candidates. At this time, the partition candidates available to the coding block may include an asymmetric partition type (for example, nL×2N, nR×2N, 2N×nU, 2N×nD) depending on a size, a shape, an encoding mode or the like of the coding block. For example, the partition candidates available to the coding block may be determined according to the encoding mode of the current block. For example, when the coding block is encoded by inter prediction, one of 8 partition modes may be applied to the coding block, as in the example shown in FIG. 3B. On the other hand, when the coding block is encoded by intra prediction, PART 2N×2N or PART N×N among the 8 partition modes of FIG. 3B may be applied to the coding block.

PART N×N may be applied when the coding block has a minimum size. Here, the minimum size of the coding block may be pre-defined in the encoder and the decoder. Alternatively, information regarding the minimum size of the coding block may be signaled via the bitstream. For example, the minimum size of the coding block may be signaled through a slice header, so that the minimum size of the coding block may be defined for each slice.

In another example, partition candidates available to a coding block may be determined differently depending on at least one of a size or shape of the coding block. For example, the number or type of partition candidates available to the coding block may be determined differently according to at least one of the size or shape of the coding block.

Alternatively, the type or number of asymmetric partition candidates among the partition candidates available to the coding block may be limited depending on the size or shape of the coding block. For example, the number or type of asymmetric partition candidates available to the coding block may be differently determined according to at least one of the size or shape of the coding block.

In general, a prediction block may have a size from 64×64 to 4×4. However, when a coding block is encoded by inter prediction, it is possible to prevent the prediction block from having a 4×4 size in order to reduce a memory bandwidth when performing motion compensation.

It is also possible to recursively divide a coding block using the partition mode. That is, the coding block may be divided according to the partition mode indicated by a partition index, and each partition generated by partitioning the coding block may be defined as a coding block.

Hereinafter, a method of recursively partitioning a coding unit will be described in more detail. For convenience of explanation, it is assumed that a coding tree unit is also included in a category of a coding unit. That is, in a later-described embodiment, a coding unit may refer to a coding tree unit, or may refer to a coding unit that is generated resulting from partitioning the coding tree unit. Also, when a coding block is recursively divided, it can be understood that a 'partition' generated by partitioning the coding block means a 'coding block'.

A coding unit may be divided by at least one line. At this time, the line dividing the coding unit may have a predetermined angle. Here, the predetermined angle may be a value within a range of 0-degree to 360-degree. For example, a 0-degree line may mean a horizontal line, a 90-degree line may mean a vertical line, and a 45-degree or 135-degree line may mean a diagonal line.

When a coding unit is divided by a plurality of lines, all of the plurality of lines may have the same angle. Alternatively, at least one of the plurality of lines may have an angle different from the other lines. Alternatively, the plurality of lines dividing a coding tree unit or a coding unit may be set to have a predefined angle difference (e.g., 90-degree).

Information regarding the line dividing a coding tree unit or a coding unit may be defined as a partition mode and be encoded. Alternatively, information on the number of lines, directions, angles, positions of lines in a block, or the like may be encoded.

For convenience of explanation, it is assumed in the embodiment described below that a coding tree unit or a coding unit is divided into a plurality of coding units using at least one of a vertical line and a horizontal line.

When it is assumed that partitioning of a coding unit is performed based on at least one of a vertical line or a horizontal line, the number of vertical lines or horizontal lines partitioning the coding unit may be one or more. For example, the coding tree unit or the coding unit may be divided into two partitions using one vertical line or one horizontal line, or the coding unit may be divided into three partitions using two vertical lines or two horizontal lines. Alternatively, the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size. Alternatively, any one partition may have a different size from the remaining partitions or each partition may have a different size.

In the embodiments described below, it is assumed that dividing a coding unit into four partitions is a quad-tree based partitioning, and that dividing a coding unit into two partitions is a binary-tree based partitioning. In addition, it is assumed that dividing a coding unit into three partitions is a triple-tree based partitioning. In addition, it is assumed that a dividing scheme by applying at least two or more partitioning scheme is a multi-tree based partitioning.

In the following drawings, it will be illustrated that a predetermined number of vertical lines or a predetermined number of horizontal lines are used to divide a coding unit, but it will also be within a scope of the present invention to divide the coding unit into more partitions or fewer partitions than shown using a greater number of vertical lines or a greater number of horizontal lines than shown.

Figure 4A:
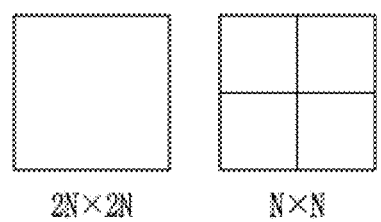
FIGS. 4A to 4C are diagram illustrating a partition type in which a quad tree and a binary tree partitioning are allowed according to an embodiment of the present invention.
Figure 4B:
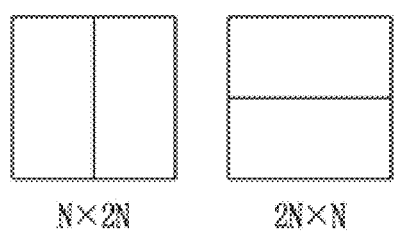
Figure 4C:
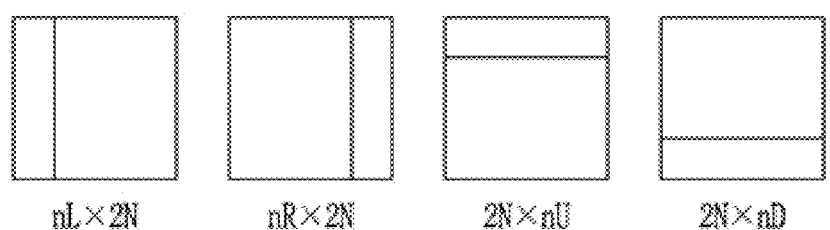

FIGS. 4A to 4C are diagram illustrating a partition type in which a quad tree and a binary tree partitioning are allowed according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks (FIG. 4A), and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. In addition, the coding block partitioned based on the binary tree may be a square block or a non-square block, such as a rectangular shape. For example, as depicted in FIG. 4B, a partition type in which the binary tree-based partitioning is allowed may be a symmetric type of 2N×N (horizontal directional non-square coding unit) or N×2N (vertical direction non-square coding unit). In addition, as one example depicted in FIG. 4C, a partition type in which the binary tree-based partitioning is allowed may be an asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree CU partitioning. Constructing the coding tree unit with square blocks and symmetric non-square blocks may correspond to quad and binary tree CU partitioning.

Hereinafter, a partitioning scheme based on a quad-tree and a binary-tree is referred to as Quad-Tree & Binary-Tree (QTBT) partitioning.

As a result of partitioning based on quad-tree and binary-tree, a coding block that is no longer divided may be used as a prediction block or a transform block. That is, in a quad-tree & binary-tree (QTBT) partitioning method, a coding block may become a prediction block, and a prediction block may become a transform block. For example, when the QTBT partitioning method is used, a prediction image may be generated in a unit of a coding block, and a residual signal, which is a difference between an original image and the prediction image, is transformed in a unit of a coding block. Here, generating the prediction image in a unit of a coding block may mean that motion information is determined based on a coding block or an intra prediction mode is determined based on a coding block. Accordingly, a coding block may be encoded using at least one of a skip mode, intra prediction, or inter prediction.

As another example, it is also possible to divide a coding block so as to use a prediction block or a transform block having a size smaller than the coding block.

In a QTBT partitioning method, BT may be set to be allowed only for symmetric partitioning. However, if only the symmetric binary tree is allowed even though an object and a background are divided at a block boundary, an encoding efficiency may be decreased. In the present invention, a method of asymmetric partitioning a coding block in order to increase an encoding efficiency will be described below as another embodiment. Asymmetric binary tree partitioning represents a division of a coding block into two smaller coding blocks. As a result of the asymmetric binary tree partitioning, a coding block may be divided into two coding blocks of an asymmetric shape.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5:
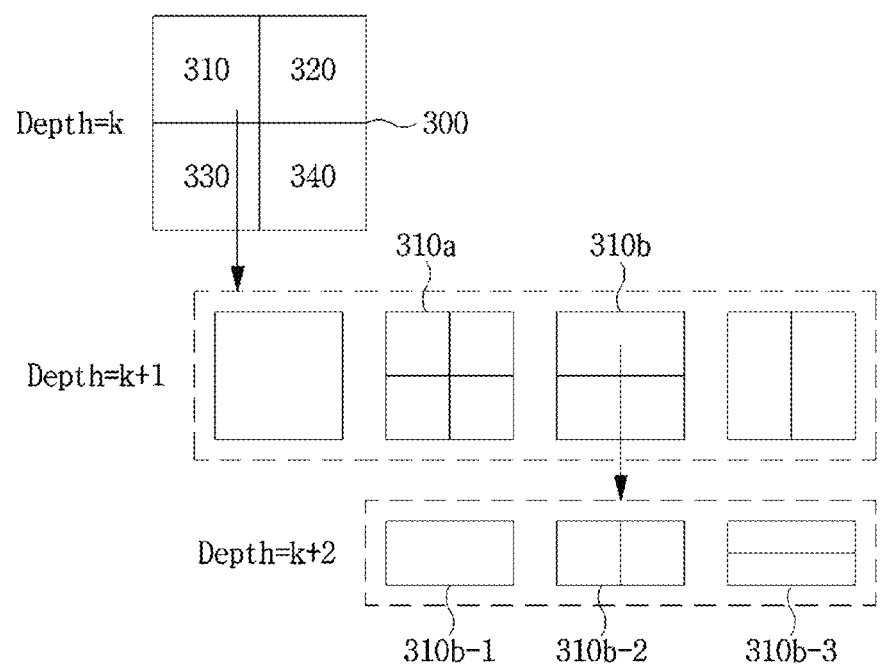
FIG. 5 illustrates an example in which a coding block is hierarchically divided based on quad tree partitioning and binary tree partitioning, according to an embodiment to which the present invention is applied.

FIG. 5 illustrates an example in which a coding block is hierarchically divided based on quad tree partitioning and binary tree partitioning, according to an embodiment to which the present invention is applied.

As shown in FIG. 5, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

Figure 6A:
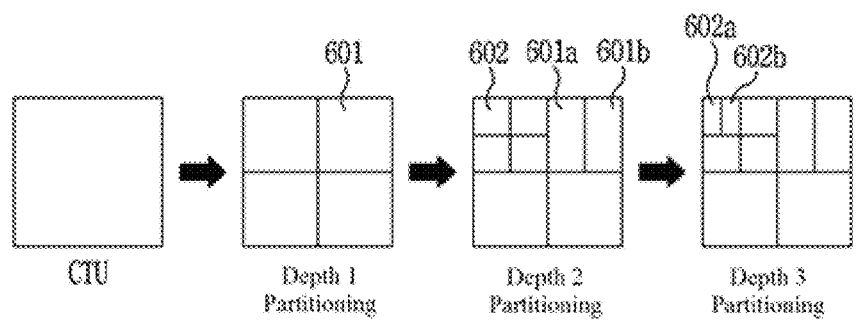
FIGS. 6A to 6C illustrates an example in which a coding block is hierarchically divided based on quad tree partitioning and symmetric binary tree partitioning, according to an embodiment to which the present invention is applied.
Figure 6B:
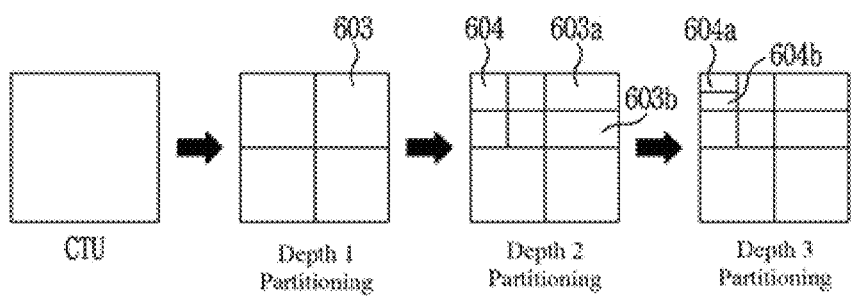
Figure 6C:
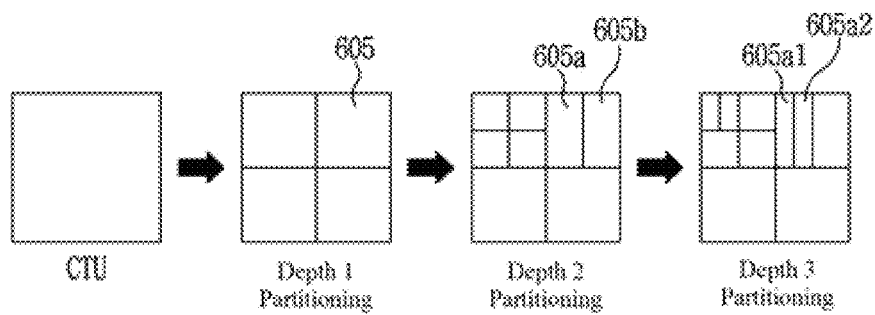

FIGS. 6A to 6C illustrates an example in which a coding block is hierarchically divided based on quad tree partitioning and symmetric binary tree partitioning, according to an embodiment to which the present invention is applied.

FIGS. 6A to 6C illustrates an example in which only a specific type, for example a symmetric binary tree based partitioning, is allowed. FIG. 6A shows an example in which only binary tree based partitioning in a type of N×2N is limitedly allowed. For example, a depth 1 coding block 601 is divided into two N×2N blocks 601a and 601b in depth 2, and a depth 2 coding block 602 is divisible into two N×2N blocks 602a and 602b in depth 3.

FIG. 6B shows an example in which only binary tree based partitioning of a 2N×N type is limitedly allowed. For example, a depth 1 coding block 603 is divided into two 2N×N blocks 603a and 603b in depth 2, and a depth 2 coding block 604 is divisible into two 2N×N blocks 604a and 604b in depth 3.

FIG. 6C shows an example of partitioning a block which is generated by a symmetric binary tree partitioning. For example, a depth 1 coding block 605 is divided into two N×2N blocks 605a and 605b in depth 2, and the depth 2 coding block 605a generated as a result of the division is divided into two N×2N blocks 605a1 and 605a2. The above described divisional manner is also applicable to a 2N×N coding block which is generated by symmetric binary tree partitioning.

In order to implement quad-tree or binary tree based adaptive partitioning, information indicating quad-tree based partitioning, information on a size/depth of a coding block to which quad-tree based partitioning is allowed, information indicating binary-tree based partitioning, information about a size/depth of a coding block to which binary-tree based partitioning is allowed, information on a size/depth of a coding block to which binary-tree based partitioning is disallowed, information whether binary-tree based partitioning is performed in a vertical direction or a horizontal direction, or the like may be used. For example, quad_split_flag may indicate whether a coding block is divided into four coding blocks, and binary_split_flag may indicate whether a coding block is divided into two coding blocks. When a coding block is divided into two coding blocks, is_hor_split_flag indicating whether a partitioning direction of the coding block is a vertical direction or a horizontal direction may be signaled.

Also, for a coding tree unit or a predetermined coding unit, the number of times for which binary tree partitioning is allowed, a depth at which binary tree partitioning is allowed, or the number of the depths to which the binary tree partitioning is allowed may be obtained. The information may be encoded in a unit of a coding tree unit or a coding unit, and may be transmitted to the decoder through a bitstream.

For example, a syntax 'max_binary_depth_idx_minus1' indicating a maximum depth at which binary tree partitioning is allowed may be encoded/decoded through the bitstream. In this case, max_binary_depth_idx_minus1+1 may indicate a maximum depth at which binary tree partitioning is allowed.

In addition, in the example of FIG. 6C described above, it is illustrated a result of binary tree partitioning relating to depth 2 coding units (e.g., 605a and 605b) and depth 3 coding units (e.g., 605a1 and 605a2). Thus, at least one of information indicating the number of times (e.g., twice) for which binary tree partitioning has been performed in the coding tree unit, information indicating a maximum depth (e.g., depth 3) at which binary tree partitioning is allowed in the coding tree unit, or information indicating the number of depths (e.g., 2, depth 2 and depth 3) to which binary tree partitioning is allowed may be encoded/decoded through the bitstream.

As another example, at least one of the number of times for which binary tree partitioning is allowed, a depth at which binary tree partitioning is allowed, or the number of depths to which binary tree partitioning is allowed may be obtained for each sequence or slice. For example, the information may be encoded in a unit of a sequence, a picture, or a slice and transmitted through the bitstream. Accordingly, a first slice and a second slice may differ in at least one of the number of times for which binary tree partitioning is performed, a maximum depth at which binary tree partitioning is allowed, or the number of depths to which binary tree partitioning is allowed. For example, in the first slice, binary tree partitioning is allowed at only one depth, while in the second slice, binary tree partitioning is allowed at two depths.

As another example, at least one of the number of times for which binary tree partitioning is allowed, a depth at which binary tree partitioning is allowed, or the number of depths to which binary tree partitioning is allowed may be set differently according to a time level identifier (Temporal_ID) of a slice or a picture. Here, the temporal level identifier (Temporal_ID) is used to identify each of a plurality of layers of a video having a scalability of at least one of view, spatial, temporal or image quality.

It is also possible to restrict use of a transform skip for a CU which is partitioned by binary partitioning. Alternatively, a transform skip may be applied only in at least one of a horizontal direction or a vertical direction for a CU which is partitioned by non-square partitioning. Applying a transform skip only in a horizontal direction may mean that only a scaling and a quantization are performed in a horizontal direction without performing a transform in the horizontal direction, and a transform is performed in a vertical direction by specifying at least one transform scheme such as DCT or DST.

Likewise, applying a transform skip only in a vertical direction may mean that a transform is performed in a horizontal direction by specifying at least one transform scheme such as DCT or DST, and only a scaling and a quantization are performed in a vertical direction without performing a transform in the vertical direction. It is also possible to signal a syntax hor_transform_skip_flag indicating whether to apply a transform skip in a horizontal direction and a syntax ver_transform_skip_flag indicating whether to apply a transform skip in a vertical direction.

When a transform skip is applied to at least one of a horizontal direction or a vertical direction, information indicating a direction to which the transform skip is applied may be signaled according to a shape of a CU. Specifically, for example, for a CU of 2N×N shape, a transform is performed in a horizontal direction and a transform skip can be applied on a vertical direction, and, for a CU of N×2N shape, a transform skip can be applied in a horizontal direction and a transform is performed on a vertical direction. Here, the transform may be at least one of DCT or DST.

As another example, for a CU of 2N×N shape, a transform is performed in a vertical direction and a transform skip can be applied in a horizontal direction, and, for a CU of N×2N shape, a transform skip can be applied in a vertical direction and a transform is performed in a horizontal direction. Here, the transform may be at least one of DCT or DST.

FIGS. 7A to 7I are diagram illustrating a partition type in which multi-tree partitioning is allowed according to another embodiment of the present invention.

A method of partitioning a CTU or CU using at least one of the above-described quad tree partitioning, binary partitioning, or triple tree partitioning may be referred to multi-tree partitioning (or multi tree CU partitioning). A CTU or CU can be partitioned using any N partitions among the above mentioned examples. Specifically, for example, as shown in FIGS. 7A to 7I, a CTU or CU may be partitioned using 9 partitioning types.

For a unit of a sequence or a picture, partitioning may be performed by using all of quad tree partitioning, binary tree partitioning, and triple tree partitioning or partitioning may be performed by using one or two of quad tree partitioning, binary tree partitioning, or triple tree partitioning.

It is also possible to use quad tree partitioning as default, and to use binary tree partitioning and triple tree partitioning selectively. At this time, it is possible to signal whether to use binary tree partitioning and/or triple tree partitioning through a sequence parameter set or picture parameter set.

Alternatively, it is also possible to use quad tree partitioning and triple tree partitioning as default, and to use binary tree partitioning selectively. For example, a syntax isUseBinaryTreeFlag indicating whether binary tree partition is used may be signaled in a sequence header. If a value of the isUseBinaryTreeFlag is 1, a CTU or CU in the current sequence can be partitioned using binary tree partitioning. It is also possible to signal a syntax isUseTripleTreeFlag indicating whether triple tree partitioning is used through a sequence header. If a value of the isUseTripleTreeFlag is 1, a CTU or CU in the current sequence header may be partitioned using triple tree partitioning.

Figure 7A:
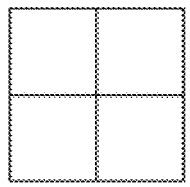
FIGS. 7A to 7I are diagram illustrating a partition type in which multi-tree partitioning is allowed according to another embodiment of the present invention.
Figure 7B:
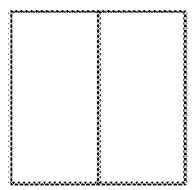
Figure 7C:
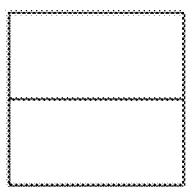
Figure 7D:
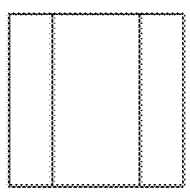
Figure 7E:
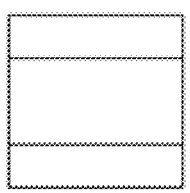
Figure 7F:
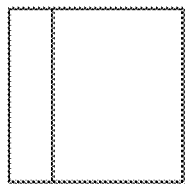
Figure 7G:
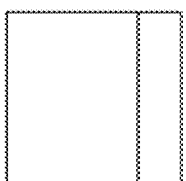
Figure 7H:
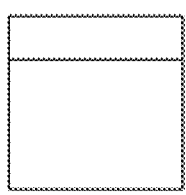
Figure 7I:
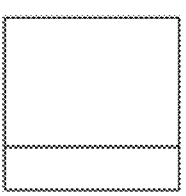

Partition shapes partitioned by multi-tree partitioning can be limited to 9 basic partitions shown in, for example, FIG. 7A to 7I. FIG. 7A shows a quad partition type, 7B to 7C show symmetric binary tree partition types, 7D to 7E show triple tree partition types and 7F to 7I show asymmetric binary tree partition types. The detailed description relating to each partition type illustrated in FIGS. 7A to 7I are omitted since they are identical to above described.

Figure 8:
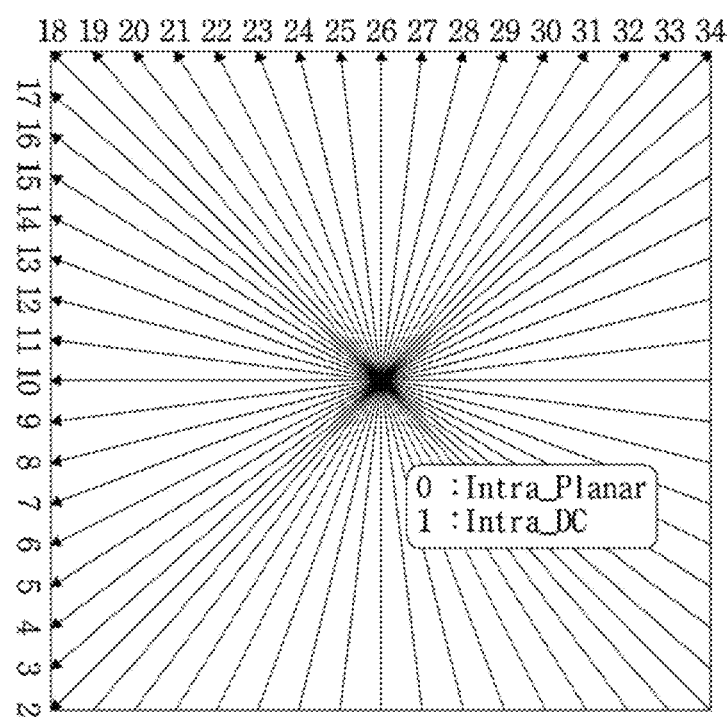
FIG. 8 is a diagram illustrating types of pre-defined intra prediction modes for a device for encoding/decoding a video according to an embodiment of the present invention.

FIG. 8 is a diagram illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

A larger number of intra prediction modes than 35 intra prediction modes shown in FIG. 8 may be used. For example, a larger number of intra prediction modes than the 35 intra prediction modes can be used by subdividing angles of directional prediction modes or by deriving a directional prediction mode having a predetermined angle using at least one of a pre-defined number of directional prediction modes. At this time, the use of a larger number of intra prediction modes than the 35 intra prediction modes may be referred to as an extended intra prediction mode.

Figure 9:
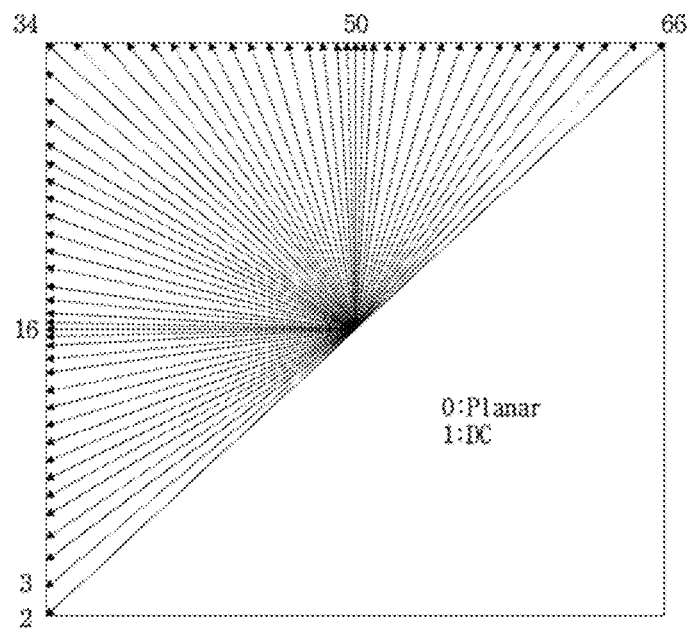
FIG. 9 is a diagram illustrating a kind of extended intra prediction modes at an encoder/decoder according to an embodiment of the present invention.

FIG. 9 shows an example of extended intra prediction modes, and the extended intra prediction modes may include two non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on the size and/or shape of the block, a different number of intra prediction modes may be used to perform intra prediction. That is, depending on the size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra_2N×2N, and only 35 directional intra prediction modes may be allowed for Intra_N×N.

A size of a block to which the extended intra prediction mode is applied may be set differently for each sequence, picture or slice. For example, it is set that the extended intra prediction mode is applied to a block (e.g., CU or PU) which has a size greater than 64×64 in the first slice. On the other hands, it is set that the extended intra prediction mode is applied to a block which has a size greater than 32×32 in the second slice. Information representing a size of a block to which the extended intra prediction mode is applied may be signaled through in units of a sequence, a picture, or a slice. For example, the information indicating the size of the block to which the extended intra prediction mode is applied may be defined as 'log 2_extended_intra_mode_size_minus4' obtained by taking a logarithm of the block size and then subtracting the integer 4. For example, if a value of log 2_extended_intra_mode_size_minus4 is 0, it may indicate that the extended intra prediction mode may be applied to a block having a size equal to or greater than 16×16. And if a value of log 2_extended_intra_mode_size_minus4 is 1, it may indicate that the extended intra prediction mode may be applied to a block having a size equal to or greater than 32×32.

As described above, the number of intra prediction modes may be determined in consideration of at least one of a color component, a chroma format, and a size or a shape of a block. In addition, the number of intra prediction mode candidates (e.g., the number of MPMs) used for determining an intra prediction mode of a current block to be encoded/decoded may also be determined according to at least one of a color component, a color format, and the size or a shape of a block. A method of determining an intra prediction mode of a current block to be encoded/decoded and a method of performing intra prediction using the determined intra prediction mode will be described with the drawings.

Figure 10:
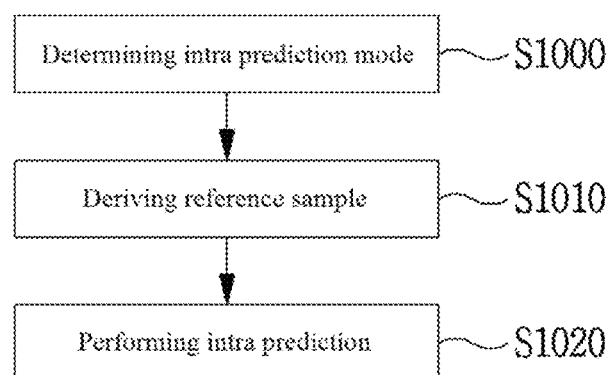
FIG. 10 is a flowchart briefly illustrating an intra prediction method according to an embodiment of the present invention.

FIG. 10 is a flowchart briefly illustrating an intra prediction method according to an embodiment of the present invention.

Referring to FIG. 10, an intra prediction mode of the current block may be determined at step S1000.

Specifically, the intra prediction mode of the current block may be derived based on a candidate list and an index. Here, the candidate list contains multiple candidates, and the multiple candidates may be determined based on an intra prediction mode of the neighboring block adjacent to the current block. The neighboring block may include at least one of blocks positioned at the top, the bottom, the left, the right, and the corner of the current block. The index may specify one of the multiple candidates of the candidate list. The candidate specified by the index may be set to the intra prediction mode of the current block.

An intra prediction mode used for intra prediction in the neighboring block may be set as a candidate. Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more.

The candidate list may further include a default mode. The default mode may include at least one of a planar mode, a DC mode, a vertical mode, and a horizontal mode. The default mode may be adaptively added considering the maximum number of candidates that can be included in the candidate list of the current block.

The maximum number of candidates that can be included in the candidate list may be three, four, five, six, or more.

The maximum number of candidates that can be included in the candidate list may be a fixed value preset in the device for encoding/decoding a video, or may be variably determined based on a characteristic of the current block. The characteristic may mean the location/size/shape of the block, the number/type of intra prediction modes that the block can use, a color type, a color format, etc.

Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, and a block level.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (a horizontal mode), it may be transformed into an index of 16 corresponding to a horizontal mode in the extended intra prediction modes.

Alternatively, when the top neighboring block uses the extended intra prediction modes and the intra prediction mode the top neighboring block has an index of 50 (a vertical mode), it may be transformed into an index of 26 corresponding to a vertical mode in the 35 intra prediction modes.

Based on the above-described method of determining the intra prediction mode, the intra prediction mode may be derived independently for each of the luma component and the chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| Intra_chroma_pred_mode | IntraPredModeY[xCb][yCb] | | | | |
|---|---|---|---|---|---|
| [xCb][yCb] | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component. Referring to FIG. 10, a reference sample for intra prediction of the current block may be derived at step S1010. Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. Filtering of neighboring samples using an intra filter may also be referred to as reference sample smoothing. The intra filter may include at least one of the first intra filter applied to multiple neighboring samples positioned on the same horizontal line and the second intra filter applied to multiple neighboring samples positioned on the same vertical line. Depending on the positions of the neighboring samples, one of the first intra filter and the second intra filter may be selectively applied, or both intra filters may be applied. At this time, at least one filter coefficient of the first intra filter or the second intra filter may be (1, 2, 1), but is not limited thereto.

Filtering may be adaptively performed based on at least one of the intra prediction mode of the current block and the size of the transform block for the current block. For example, when the intra prediction mode of the current block is the DC mode, the vertical mode, or the horizontal mode, filtering may not be performed. When the size of the transform block is N×M, filtering may not be performed. Here, N and M may be the same values or different values, or may be values of 4, 8, 16, or more. For example, if the size of the transform block is 4×4, filtering may not be performed. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than a threshold, filtering may be performed. The threshold may be defined for each size of the transform block as shown in Table 2.

TABLE 2

| | 8 × 8 transform | 16 × 16 transform | 32 × 32 transform |
|---|---|---|---|
| Threshold | 7 | 1 | 0 |

The intra filter may be determined as one of multiple intra filter candidates pre-defined in the device for encoding/decoding a video. To this end, an index specifying an intra filter of the current block among the multiple intra filter candidates may be signaled. Alternatively, the intra filter may be determined based on at least one of the size/shape of the current block, the size/shape of the transform block, information on the filter strength, and variations of the neighboring samples. Referring to FIG. 10, intra prediction may be performed using the intra prediction mode of the current block and the reference sample at step S1020.

That is, the prediction sample of the current block may be obtained using the intra prediction mode determined at step S1000 and the reference sample derived at step S1010.

Hereinafter, with reference to FIG. 11 and FIG. 12, intra prediction using a sample position based parameter according to the present invention will be described.

In the case of intra prediction, a prediction sample is generated using neighboring samples of a current block to be encoded or decoded. Therefore, when a sample value located far from a neighboring sample is predicted, a problem that a difference between the predicted value and an original sample value becomes larger may occur. In addition, a size, shape, and/or intra prediction mode of the current block may cause an occurrence and spread of such the problem.

Therefore, after obtaining a prediction block of the current block using a certain intra prediction mode, a prediction block that is more similar to an original block can be obtained by modifying all or a part of prediction samples in the prediction block based on information available by the encoder 100 or the decoder 200.

Intra prediction according to the present embodiment generates a first prediction block by performing intra prediction and then generate a second prediction block by performing a weighted prediction on the first prediction block based on a specific parameter. Here, since the specific parameter can be determined depending on a position of a sample in the first prediction block, hereinafter this will be referred to as a sample position based parameter.

Figure 11:
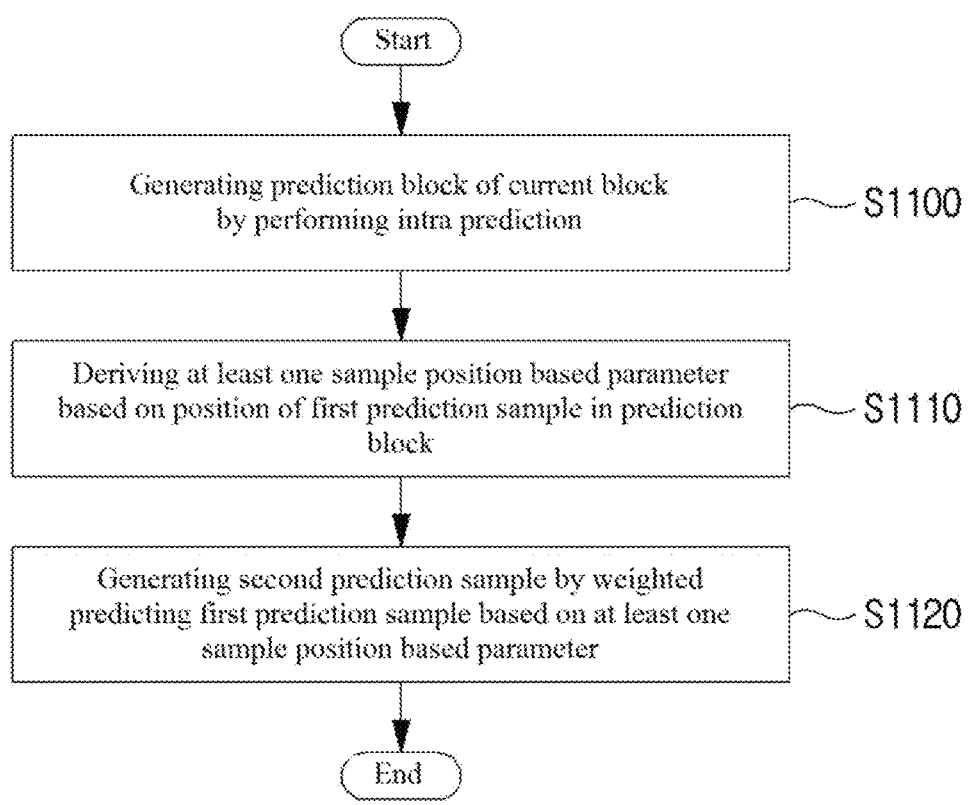
FIG. 11 is a flowchart illustrating an intra prediction method using a sample position based parameter according to an embodiment to which the present invention is applied.

FIG. 11 is a flowchart illustrating an intra prediction method using a sample position based parameter according to an embodiment to which the present invention is applied. The intra prediction method shown in FIG. 11 may be performed substantially by the intra prediction unit 125 of the image encoding apparatus 100 and the intra prediction unit 235 of the image decoding apparatus 200. In addition, steps shown in FIG. 11 relate to performing intra prediction S1020 in FIG. 10. Therefore, prior to steps shown in FIG. 11, determining an intra prediction mode S1000 and deriving reference samples S1010 of FIG. 10 may be performed.

Referring to FIG. 11, a prediction block of a current block may be generated by performing intra prediction S1100. At this time, the intra prediction method or the prediction mode may be the intra prediction method or mode described with reference to FIG. 8 or FIG. 9. However, it is not limited thereto.

Based on a position of a first prediction sample in a prediction block of a current block, at least one sample position based parameter may be derived S1110. If intra prediction using the sample position based parameter according to the present invention is performed under a specific condition, determining whether the specific condition is satisfied may be performed before the execution of step S1110. For example, at least one of a size of a block, a shape of a block, an intra prediction mode of a block, whether a directional intra prediction mode is used, or a syntax element or a parameter indicating whether intra prediction using a sample position based parameter is allowed may be considered as the specific condition.

Specifically, depending on whether a size (e.g., width or height) of a current coding block or a current prediction block to be intra-predicted is greater than a predetermined size or smaller than a predetermined size, it may be determined whether or not to perform intra prediction using a sample position based parameter.

Alternatively, depending on an intra prediction mode to be applied to a current prediction block, it may be determined whether to perform intra prediction using a sample position based parameter. According to an embodiment of the present invention, when an intra prediction mode of a current block is planar mode, intra prediction using a sample position based parameter according to the present invention may be performed. According to another embodiment of the present invention, when an intra prediction mode of a current block is a non-directional prediction mode, intra prediction using a sample position based parameter according to the present invention may be performed.

Alternatively, when a syntax element indicating whether intra prediction using a sample position based parameter is allowed is included in the bitstream generated by the image encoding apparatus 100, it may be determined whether to perform intra prediction using a sample position based parameter based on a value of the syntax element.

Alternatively, when an internal parameter or a variable indicating whether intra prediction using a sample position based parameter is allowed is derived in consideration of one or more conditions such as a size, a shape, and/or an intra prediction mode of a block, it may be determined whether to perform intra prediction using a sample position based parameter according to a value of the internal parameter or a value of the variable.

Meanwhile, a sample position based parameter is a parameter used when a prediction sample in a prediction block is modified to a new sample value using weighted prediction, as in step S1120.

A sample position based parameter may be derived in consideration of a distance between a reference sample of a predetermined position (hereinafter referred to as a base reference sample) among reference samples of a prediction block and a reference sample (hereinafter referred to as a corresponding reference sample) corresponding to a current sample, and/or a size of a block and/or a shape of a block.

A size of a block may be represented by at least one of a width or a height of the block, a sum of the width and the height, the number of samples included in the block, or the like. The above-described sample position based parameter may be derived through a result of comparison between a size of a block and a predetermined threshold value.

A shape of a block may indicate whether it is a square shape, whether it is a symmetric partition, or whether it is a rectangle of which longer side is in a horizontal direction or in a vertical direction.

Figure 12:
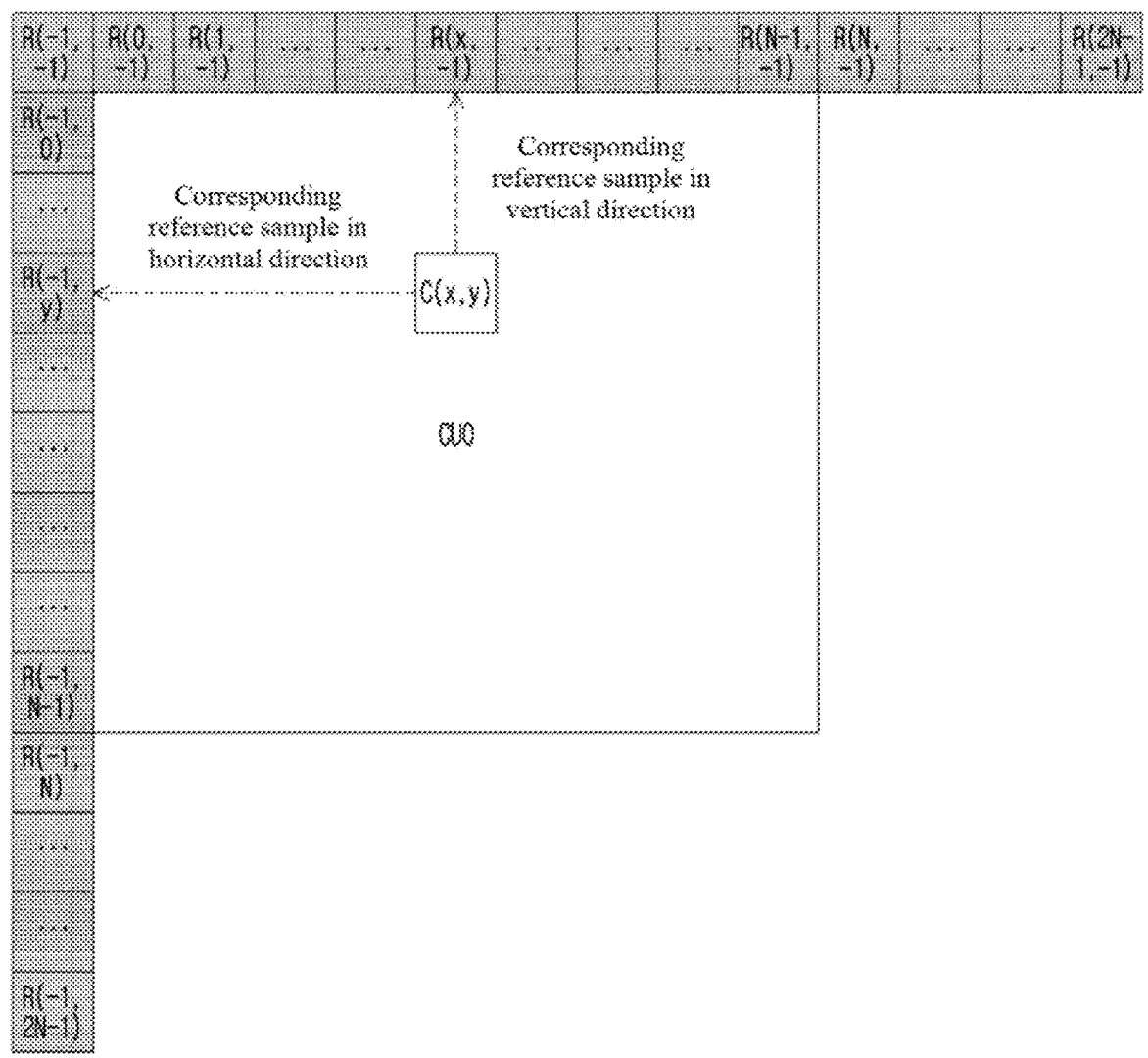
FIG. 12 illustrates a base reference sample and a corresponding reference sample according to an embodiment of the present invention.

FIG. 12 illustrates a base reference sample and a corresponding reference sample according to an embodiment of the present invention. FIG. 12 shows neighboring samples R (p, q) (p and q being integer from −1 to 2N−1) which can be used for intra prediction of a current block CU0 and a current block CU0 of N×N size to be encoded or decoded through intra prediction.

A vertical corresponding reference sample R(x, −1) and a horizontal corresponding reference sample R(−1, y) are shown as corresponding reference samples of a sample C(x, y) in the current block CU0. That is, the corresponding reference sample may be a reference sample locating on the same x-axis position or a reference sample locating on the same y-axis position as the sample C(x, y) in the current block among a plurality of reference samples. The number of corresponding reference samples may be one, two, or more. The number of corresponding reference samples may be variably determined based on a value of an intra prediction mode of a prediction block, a directionality or an angle, a width and/or height of a block, or the like. In addition, if a position of a reference sample is able to be specified by a position of a sample C(x, y), the reference sample may be used as a corresponding reference sample even though it is not located on the same x-axis or the same y-axis as the sample C(x, y) in the current block.

According to the embodiment shown in FIG. 12, R(−1, −1) may be set as a base reference sample. Of course, it is not limited to this, and a base reference sample may be a sample located at a center, a sample located at the leftmost position, a sample located at the rightmost position, or a sample adjacent thereto among a plurality of reference samples located at a top of a prediction block. Alternatively, a base reference sample may be a sample located at a center, a sample located at the uppermost position, a sample located at the lowermost position, or a sample adjacent thereto among a plurality of reference samples located on a left of a prediction block.

There is no need to restrict the number of base reference samples to one, and the number may be two or more. The number of base reference samples may be variably determined based on a value of an intra prediction mode of a prediction block, a directionality or angle, a width and/or height of a block, or the like.

A base reference sample and a corresponding reference sample may be included in a single sample line (row, column) in contact with a prediction block. Alternatively, at least one of the base reference sample and the corresponding reference sample may be included in a sample line not in contact with the prediction block.

In addition, the base and/or corresponding reference samples (e.g., a corresponding reference sample in a vertical direction and/or a corresponding reference sample in a horizontal direction) may be filtered reference samples or unfiltered reference samples The following Equations 1 and 2 show examples of sample position based parameters f(x, y) and b(x, y).

$$f(x, y) = \left[\left(C_0 \gg \frac{y}{d_y}\right) \times R(x, -1) - \right. \quad \text{[Equation 1]}$$

$$\left(C_1 \gg \frac{y}{d_y}\right) \times R(-1, -1) +$$

$$+\left(C_2 \gg \frac{x}{d_x}\right) \times R(-1, y) - \left(C_3 \gg \frac{x}{d_x}\right) \times R(-1, -1)$$

$$b(x, y) = \quad \text{[Equation 2]}$$

$$\left(N - \left(C_0 \gg \frac{y}{d_y}\right) + \left(C_1 \gg \frac{y}{d_y}\right) - \left(C_2 \gg \frac{x}{d_x}\right) + \left(C_3 \gg \frac{x}{d_x}\right)\right)$$

In the above Equations 1 and 2, x and y represent positions on x-axis and y-axis of a sample C(x, y) in a current block. R(−1, −1), R(x, −1) and R(−1, y) represent a value of a base reference sample, a value of a corresponding reference sample in a vertical direction and a value of a corresponding reference sample in a horizontal direction, respectively. $C_0$, $C_1$, $C_2$, and $C_3$ may be pre-determined constant values and may be pre-stored in the image encoding apparatus 100 or the image decoding apparatus 200. Also, N is a value indicating a weighted prediction offset.

Parameters dx and dy may be determined according to a size of a current block (e.g., a width or height of a block). For example, if a width of a block is greater than a predefined threshold value, then a value of dx may be set to 2 and if a width of a block is less than or equal to the predetermined threshold value, a value of dx may be set to 1. Similarly, when a height of a block is greater than a predefined threshold value, a value of dy may be set to 2, and if a height of a block is equal to or smaller than the predefined threshold value, a value of dy may be set to 1. According to an embodiment of the present invention, the predetermined threshold may be 8, 16, or 32, but is not limited thereto.

Referring back to FIG. 11, a second prediction sample may be generated by performing a weighted prediction for the first prediction sample based on at least one sample position based parameter derived in step S1110 S1120.

Equation 3 below represents an example in which deriving a second prediction sample P(x, y) by performing weighted prediction for a first prediction sample q(x, y) based on a sample position based parameter (e.g., f(x, y), b(x, y)).

$$P(x,y)=[f(x,y)+b(x,y)\cdot q(x,y)+(N\gg 1)]\gg \log_2 N \quad \text{[Equation 3]}$$

In Equation 3, q (x, y) is a value of an intra predicted sample C(x, y) shown in FIG. 12. q(x, y) corresponds to the value of the intra predicted sample C (x, y) shown in FIG. 12 obtained in step S1100.

Equations 1 to 3 show that a value of a second prediction sample P(x, y) is derived by weighted prediction of a value of a base reference sample, a value of a corresponding reference sample in a vertical direction, a value of a corresponding reference sample in a horizontal direction, and a first prediction sample q(x, y).

Equation 3 shows that after calculating a weighted predicted value f(x, y)+b(x, y)×q(x, y), a value of a second prediction sample P(x, y) is derived by scaling it using a weighted prediction shift parameter $\log_2 N$ and a weighted prediction offset N. In Equation 3, a value of the weighted prediction offset N may be set to 32.

Equation 4 below represents an another embodiment of deriving a value of a second prediction sample P(x, y) by performing weighted prediction for a first prediction sample q(x, y) based on a sample position based parameter (e.g., f(x, y), b(x, y)).

$$P(x,y)=[f(x,y)+b(x,y)*q(x,y)+\text{offset}]\gg\text{shift}$$

$$b(x,y)=(1\ll\text{shift})-f(x,y) \quad \text{[Equation 4]}$$

In Equation 4, a parameter shift and a parameter offset indicate a weighted prediction shift parameter and a weighted prediction offset, respectively. Similarly to Equation 3, Equation 4 shows that after calculating a weighted predicted value f(x, y)+b(x, y)*q(x, y), a value of second prediction sample P(x, y) is derived by scaling it using a weighted prediction shift parameter shift and a weighted prediction offset parameter offset.

Meanwhile, in Equation 3, it is exemplified that a fixed value is used for the weighted prediction shift parameter and the weighted prediction offset. However, the weighted prediction shift parameter shift and the weighted prediction offset parameter offset according to the present embodiment may be derived according to a width value of a block or a height value of a block as shown in Equation 5.

offset=(log 2 width+log 2 height)>>1 shift=log 2 width+log 2 height  [Equation 5]

According to an embodiment of the present invention, when a current block is a non-square block obtained by binary tree partitioning or multi-tree partitioning, a weighted prediction shift parameter shift and a weighted prediction offset parameter offset may be derived based on a width or height of the current block as shown in Equation 5.

Meanwhile, as shown in Equations 3 or 4, there does not have to use all of parameters f(x, y), b(x, y), offset and shift which are used to derive a second prediction sample, in some cases some parameters may not be used.

Although an intra prediction method using a sample position based parameter according to the embodiment of the present invention shown in FIG. 11 has been described for the case of modifying one sample value in the prediction block, but the method can be applied to all samples in the prediction block or samples in a partial region in the prediction block. The partial region may be one row/column or a plurality of rows/columns, and it may be a predetermined area by the image encoding apparatus 100 or the image decoding apparatus 200. For example, modification may be performed on one row/column located at a boundary of the prediction block or a plurality of rows/columns from the boundary of the prediction block.

Alternatively, the partial region may be a sub-block in a prediction block, not a row or a column.

Alternatively, the partial region may be variably determined based on at least one of a size/shape of a prediction block or an intra prediction mode.

Meanwhile, according to the embodiment of the present invention shown in FIG. 11, step S1100 is performed before step S1110, but step S1110 may be executed before step S1100, or both of them may be performed in parallel. However, step S1120 is executed after performing steps S1100 and S1110.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method of decoding a video, the method comprising:
generating a prediction sample of a current block based on an intra prediction mode of the current block;
determining whether to modify the prediction sample or not;
when it is determined to modify the prediction sample, deriving a first sample position based parameter for modifying the prediction sample in the current block;
obtaining a modified prediction sample based on the prediction sample and the first sample position based parameter;
obtaining a residual sample of the current block; and
obtaining a reconstruction sample based on the modified prediction sample and the residual sample,
wherein the first sample position based parameter being derived based on a multiplication of a reference sample adjacent to the current block and a first weight,
wherein the first weight is derived by shifting a constant value based on a value derived based on a coordinate of the prediction sample and a shift parameter,
wherein the shift parameter is derived based on a width and a height of the current block, and
wherein the shift parameter is derived based on a sum of $\log_2$ width and $\log_2$ height.

2. The method of claim 1, wherein obtaining the modified prediction sample is derived by adding the first sample position based parameter to a weighted prediction sample,
wherein the weight prediction sample is derived based on a multiplication of a second weight and the prediction sample.

3. The method of claim 2, wherein the second weight is derived based on a subtraction the first weight from a constant value.

4. The method of claim 1, wherein a determination of whether to modify the prediction sample is based on at least one of a size of the current block, and the intra prediction mode of the current block.

5. A method of encoding a video, the method comprising:
generating a prediction sample of a current block based on an intra prediction mode of the current block;
determining whether to modify the prediction sample or not;
when it is determined to modify the prediction sample, deriving a first sample position based parameter for modifying the prediction sample in the prediction block;
obtaining a modified prediction sample based on the prediction sample and the first sample position based parameter;
obtaining a residual sample of the current block; and
obtaining a reconstruction sample based on the modified prediction sample and the residual sample,
wherein the first sample position based parameter being derived based on a multiplication of a reference sample adjacent to the current block and a first weight,
wherein the first weight is derived by shifting a constant value based on a value derived based on a coordinate of the prediction sample and a shift parameter,
wherein the shift parameter is derived based on a width and a height of the current block, and
wherein the shift parameter is derived based on a sum of $\log_2$ width and $\log_2$ height.

6. The method of claim 5, wherein obtaining the modified prediction sample is derived by adding the first sample position based parameter to a weighted prediction sample,
wherein the weight prediction sample is derived based on a multiplication of a second weight and the prediction sample.

7. The method of claim 6, wherein the second weight is derived based on a subtraction the first weight from a constant value.

8. The method of claim 5, wherein a determination of whether to modify the prediction sample is based on at least one of a size of the current block, and the intra prediction mode of the current block.

9. A non-transitory computer readable recoding medium comprising a video signal bitstream, the video signal bitstream included in the recoding medium is encoded by a video encoding method comprising:
generating a prediction sample of a current block based on an intra prediction mode of the current block;
determining whether to modify the prediction sample or not;
when it is determined to modify the prediction sample, deriving a first sample position based parameter for modifying the prediction sample in the prediction block;

obtaining a modified prediction sample based on the prediction sample and the first sample position based parameter;

obtaining a residual sample of the current block; and obtaining a reconstruction sample based on the modified prediction sample and the residual sample, wherein the first sample position based parameter being derived based on a multiplication of a reference sample adjacent to the current block and a first weight, wherein the first weight is derived by shifting a constant value based on a value derived based on a coordinate of the prediction sample and a shift parameter, wherein the shift parameter is derived based on a width and a height of the current block, and wherein the shift parameter is derived based on a sum of $\log_2$ width and $\log_2$ height.

* * * * *